United States Patent
Rogers et al.

(10) Patent No.: US 6,956,527 B2
(45) Date of Patent: Oct. 18, 2005

(54) WIRELESS NETWORK ACCESS POINT CONFIGURATION

(75) Inventors: Christopher B. Rogers, Beaverton, OR (US); Stephen R. Wood, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1 day.

(21) Appl. No.: 10/178,871

(22) Filed: Jun. 24, 2002

(65) Prior Publication Data

US 2003/0234741 A1 Dec. 25, 2003

(51) Int. Cl.[7] .................................. G01S 3/02
(52) U.S. Cl. ............................ 342/458
(58) Field of Search ................. 342/463, 464, 342/457–458, 450; 455/456.1, 456.5, 456.6

(56) References Cited

U.S. PATENT DOCUMENTS

| | | | | |
|---|---|---|---|---|
| 5,515,062 A | * | 5/1996 | Maine et al. ............... | 342/457 |
| 5,883,598 A | | 3/1999 | Parl et al. ................. | 342/457 |
| 6,031,862 A | | 2/2000 | Fullerton et al. .......... | 375/200 |
| 6,249,252 B1 | * | 6/2001 | Dupray ..................... | 342/450 |
| 6,295,022 B1 | * | 9/2001 | Dutka ..................... | 342/357.06 |
| 6,308,073 B1 | | 10/2001 | Petty et al. ................ | 455/456 |
| 6,414,635 B1 | * | 7/2002 | Stewart et al. ............ | 342/457 |
| 6,442,507 B1 | * | 8/2002 | Skidmore et al. .......... | 342/463 |
| 6,505,045 B1 | * | 1/2003 | Hills et al. ................ | 455/449 |
| 6,529,164 B1 | * | 3/2003 | Carter ..................... | 342/463 |
| 6,618,005 B2 | * | 9/2003 | Hannah et al. ........... | 342/357.1 |
| 6,664,925 B1 | * | 12/2003 | Moore et al. ............. | 342/451 |
| 2002/0058502 A1 | * | 5/2002 | Stanforth ................ | 455/422 |
| 2002/0080759 A1 | * | 6/2002 | Harrington et al. ....... | 370/338 |
| 2002/0122003 A1 | * | 9/2002 | Patwari et al. ........... | 342/450 |
| 2003/0001776 A1 | | 1/2003 | Hannah et al. ........... | 342/387 |
| 2003/0043073 A1 | * | 3/2003 | Gray et al. ............... | 342/465 |
| 2004/0029558 A1 | * | 2/2004 | Liu ........................ | 455/456.1 |
| 2004/0235497 A1 | * | 11/2004 | Zekavat .................. | 455/456.1 |

FOREIGN PATENT DOCUMENTS

WO    WO-98/52376    11/1998    ......... H04Q/7/38

OTHER PUBLICATIONS

P. Deng et al., An AOA assisted TOA positioning system, International Conference on Communication Technology Proceeding vol. 2, p. 1501–1504, Aug. 2000.*
C. Drane et al., Positioning GSM telephones, IEEE Communications Magazine, vol. 36(4), p. 46–54, 59, Apr. 1998.*
S.S. Wang et al., E–911 location standards and location commercial services, IEEE Emerging Technologies Symposium: Broadband, Wireless Internet Access, p. 1–5, Apr. 2000.*
Xinrong, Li, et al., "Comparison of indoor geolocation methods in DSSS and OFDM wireless LAN systems", *IEEE 2000, 6*, (Sep. 24, 2000), 3015–3020.

* cited by examiner

*Primary Examiner*—Thomas H. Tarcza
*Assistant Examiner*—Fred H. Mull
(74) *Attorney, Agent, or Firm*—John F. Travis

(57) ABSTRACT

A wireless network having wireless network access devices may determine the location of newly added wireless network access devices.

17 Claims, 8 Drawing Sheets

WIRELESS NETWORK ACCESS POINT CONFIGURATION

BACKGROUND

Wireless networks allow mobile network nodes to connect to the network without being tethered by wires. Mobile network nodes typically connect to the network by communicating with a wireless network access point (NAP) device. Some wireless networks utilize a single NAP, and other networks use multiple NAPs.

For the reasons stated above, and for other reasons stated below which will become apparent to those skilled in the art upon reading and understanding the present specification, there is a need in the art for alternate methods and apparatus for wireless networks.

DESCRIPTION OF EMBODIMENTS

Figure 1:
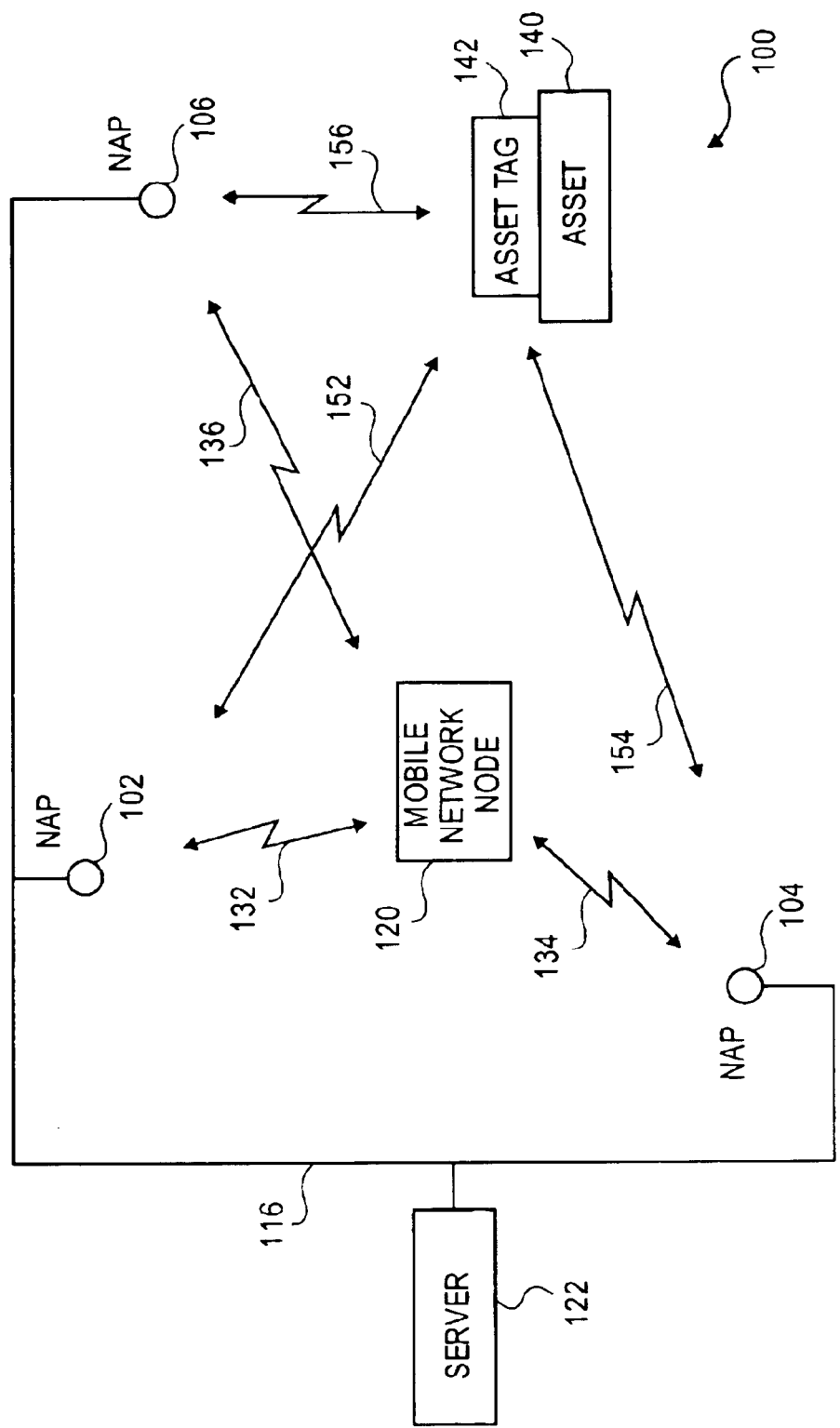
FIG. 1 shows a diagram of a wireless network.

In the following detailed description of the embodiments, reference is made to the accompanying drawings which show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

In various embodiments of the present invention as described in more detail below, network access point devices may be configured by a network. The configuration may include determining a location of the network access point device, and may also include determining the location of the network access point device relative to a boundary or relative to other fixed objects.

FIG. 1 shows a diagram of a wireless network. Wireless network 100 includes server 122, network access points (NAPs) 102, 104, and 106, mobile network node 120, asset 140, and asset tag 142. Access points 102, 104, and 106 are coupled to server 122 by media 116, and one or more of access points 102, 104, and 106 are coupled to node 120 by wireless links 132, 134, and 136. The combination of access points 102, 104, and 106, and server 122 provide network services to mobile network node 120 and asset tag 142. In addition, node 120 may, in some embodiments, provide network services to other nodes (not shown), or to any of access points 102, 104, and 106.

Wireless network 100 may be any type of network that allows a node to access network services using a wireless link. For example, in some embodiments of the present invention, wireless network 100 represents a cellular telephone network, and in other embodiments, wireless network 100 represents a wireless local area network (WLAN) or wireless personal area network (WPAN). In still further embodiments, wireless network 100 is a hybrid system that provides a combination of different services to network nodes and access points. For example, in some embodiments, wireless network 100 provides asset tracking services to mobile network nodes. Media 116 may be any type of signal transmission media capable of providing a data communication path between server 122 and access points 102, 104, and 106. Examples include, but are not limited to: wires, fiber optic cables, and wireless links.

Asset tag 142 is an item that can be physically affixed to an asset that is tracked. For example, in the embodiments represented by FIG. 1, asset tag 142 is affixed to asset 140. The location of asset tag 142 may be tracked by wireless network 100, and the location of tracked assets may be communicated to network nodes such as mobile network node 120.

Mobile network node 120 may be any type of network node capable of accessing network services using a wireless link. For example, node 120 may be a cellular telephone, a computer, a personal digital assistant (PDA), or any other type of device that can access a network using a wireless link. In some embodiments, node 120 may be a combination cellular phone and computer that provides both wireless data and voice services. In other embodiments, node 120 may be a device that displays asset tracking information to a user having access to node 120.

In general, nodes and access points are network elements that may provide network services, receive network services, or both. For example, in cellular network embodiments, access points 102, 104, and 106 may be cellular base stations that provide network services and node 120 may be a cellular telephone that primarily receives network services. Also for example, in wireless LAN embodiments, access points 102, 104, and 106, and node 120 may be computers that provide and receive network services. The remainder of this description describes many different embodiments of the present invention, with an emphasis on wireless LAN embodiments. The emphasis on wireless LAN embodiments is provided for clarity, and one of ordinary skill in the art will understand that embodiments of the present invention are not to limited wireless LANs.

In operation, wireless network 100 provides the ability to determine the location of mobile network nodes, asset tags, and network access points. Throughout this description, this ability is referred to as "location determination." Wireless network 100 provides location determination of node 120 through the use of wireless links 132, 134, and 136. Wireless network 100 also provides location determination of asset tag 142 through the use of wireless links 152, 154, and 156. Location determination of network access points is described in more detail with reference to later figures. Networks that provide location determination are referred to herein as "location-aware networks." Wireless network 100 is a location-aware network that provides location determination of node 120, asset tag 142, and network access points through the use of the various wireless links.

Wireless links 132, 134, and 136 provide communication paths between node 120 and access points 102, 104, and 106. Wireless links 152, 154, and 156 provide communication paths between asset tag 142 and access points 102, 104, and 106. The various access points send and receive wireless signals to and from node 120 and asset tag 142 on the wireless links, and also send and receive signals to and from server 122 using media 116. In some embodiments, network node 120 communicates with the network using only one of the wireless links shown, but multiple network access points receive the signals transmitted by network node 120.

In some embodiments, the wireless links utilize a pulse-based radio frequency (RF) protocol to provide communications between node 120, asset tag 142, and access points 102, 104, and 106. In these embodiments, short RF pulses are transmitted by node 120 and asset tag 142, and these short RF pulses are received by access points 102, 104, and 106. In other embodiments, the wireless links utilize baseband modulated protocols in which the desired data to be transmitted is superimposed by various means on a sinusoidal carrier signal. One example of a suitable pulse-based protocol is the emerging ultra-wideband (UWB) protocol in which low power, short duration, pulses are transmitted over the wireless link. Another example of a suitable pulse-based protocol is described in U.S. Pat. No. 6,031,862, issued to Fullerton et al., on Feb. 29, 2000. In other embodiments, the various wireless links utilize a data modulated sinusoidal carrier. Any type of wireless protocol can be utilized for the wireless links.

Information received from wireless network node 120 may include any information contained within the signals received from node 120. For example, the signals may contain voice information or data information, in any analog or digital format suitable for requesting or providing network services. Information received from asset tag 142 may also include any type of information. For example, an asset tag may send information representing a serial number, an asset description, or any other information of use to wireless network 100.

When receiving wireless signals, the various access points may also gather information describing attributes of the wireless signals. For example, in pulse-based embodiments, the access points may gather pulse time-of-arrival information as well as angle-of-arrival, pulse amplitude, pulse duration, and rise/fall time information. In sinusoidal carrier embodiments, the access points may gather center frequency, amplitude, angle-of-arrival, phase offset, or other information. In general, information gathered describing attributes of the received signals may include any information suitable to support location determination or asset tracking. For example, pulse time-of-arrival information or angle-of-arrival information, or both, may be used to determine the location of node 120 or asset tag 142 relative to the locations of access points 102, 104, and 106. Also for example, phase offset of a received sinusoidal carrier signal may also be used in support of location determination.

Attributes of received wireless signals may be transmitted from the various access points to server 122. These attributes may then be used by server 122 to determine the locations of node 120 or asset tag 142. For example, in pulse-based embodiments, pulse time-of-arrival or pulse angle-of-arrival information gathered by the access points may be used to resolve locations relative to the locations of the access points that measure the time-of-arrival and/or angle-of-arrival. Also for example, in sinusoidal carrier embodiments, phase offsets may be used to resolve the locations.

FIG. 1 shows three access points. In embodiments with three access points capable of receiving wireless signals, the location of various network elements may be determined in two dimensions. Some embodiments have more than three access points. In embodiments with four or more access points capable of receiving wireless signals, the location of various network elements may be determined in three dimensions. In some embodiments, information about the environment may be combined with information from access points to determine the locations of network elements. For example, information describing the placement of walls, ceilings, or obstructions may be combined with information from two network access points to determine the location of objects in two dimensions.

Figure 2:
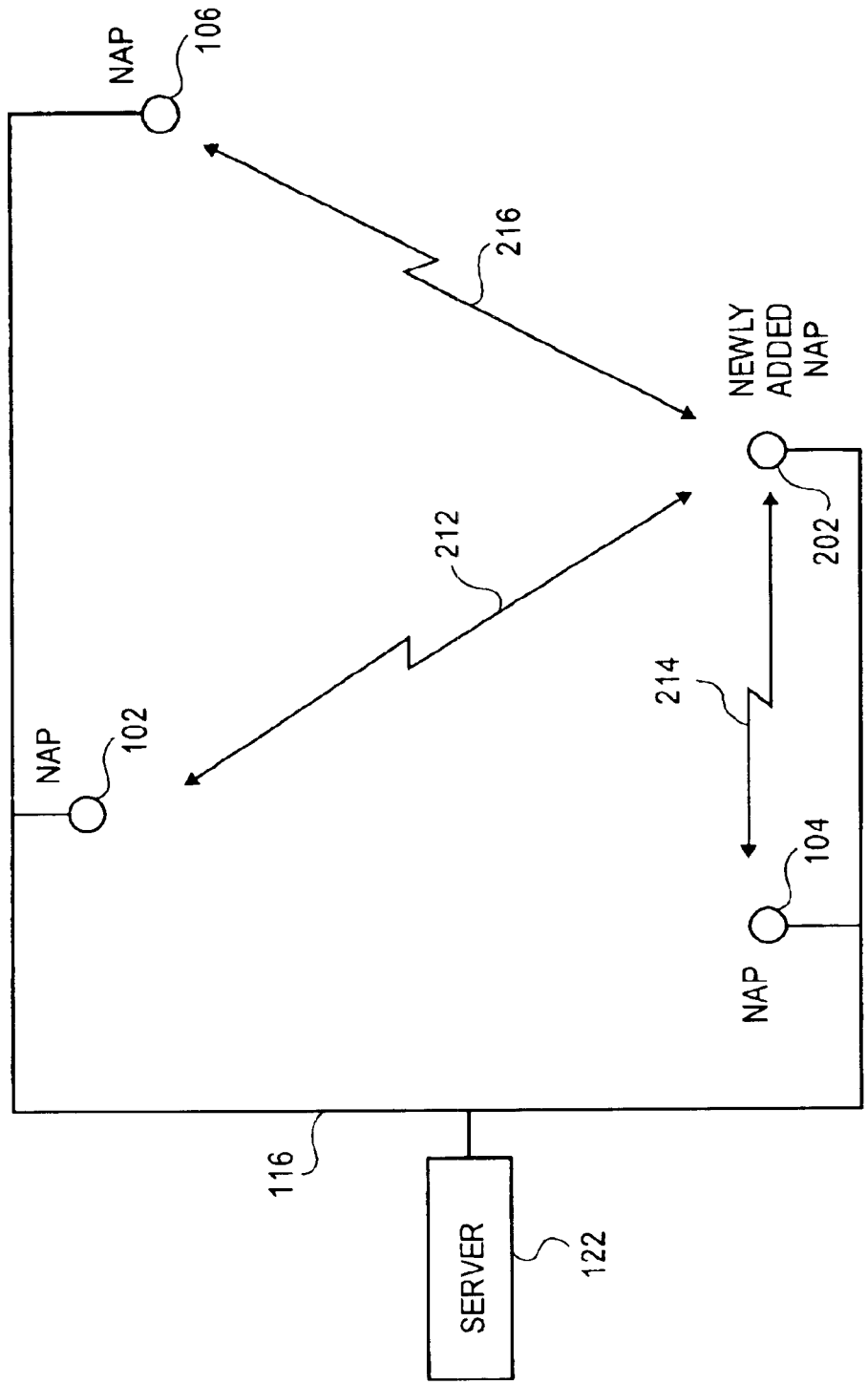
FIG. 2 shows a diagram of a wireless network with a newly added network access point.

FIG. 2 shows a diagram of a wireless network with a newly added network access point. Network 200 includes server 122, media 116, and network access points 102, 104, 106, and 202. Network access point 202 is a newly added network access point. A newly added network access point is a network access point that has yet to be configured. For example, a newly added network access point may need to be "located" so that the newly added network access point may work together with other network access points to determine the location of various network elements as described above with reference to FIG. 1. Configuration of a network access point may include many operations, of which location determination is one.

Network access point 202 represents any network access point that may be configured. For example, network access point 202 may be a network access point that has been in the network for some time, but that has recently been moved. When a network access point is moved, it may be configured as if it were a newly added access point. One operation that may be performed to a recently moved network access point is location determination.

In operation, newly added network access point 202 communicates with NAPs 102, 104, and 106 with wireless signals on wireless links 212, 214, and 216, respectively. In some embodiments, during configuration, newly added access point 202 transmits wireless signals that are received by NAPs 102, 104, and 106, and the location of newly added access point 202 my be determined in the manner described above in FIG. 1. In other embodiments, newly added access point 202 receives wireless signals, measures their attributes, and determines the location of newly added access point 202 relative to the locations of NAPs 102, 104, and 106.

The location of a newly added access point may be determined by a server or by the access point itself. For example, server 122 may determine the location of newly added access point 202, or newly added access point 202 may determine its own location. Further, the location information may be stored in the server, the access point, or multiple access points.

Any number of access points may be located in the manner just described. For example, the locations of network access points 102, 104, and 106 may be determined as part of a configuration process. In some embodiments, the location of any particular network access point is determined when the network access point is added to the network. In other embodiments, the location of a network access point is determined when the network access point is moved.

As described above, various embodiments of the present invention provide for location determination of newly added network access points by using the known locations of the access points already in the network. By self-locating newly added network access points relative to existing access points, the process of expanding the coverage of network 200 may be greatly simplified. The newly added NAPs, when installed may determine their position relative to other access points that are already at known and measured locations.

In some embodiments, additional NAPs that are within range of the newly added access point may be used to over-resolve the location of the newly added access point. For example, various permutations of existing established location NAPs may be used to provide a "point cloud" of coordinates identifying the location of the newly added NAP. Statistical methods may then be employed to enhance the resolution and accuracy of the resulting measurement of the new NAP.

The existing NAPs may resolve the location of the fourth newly added NAP and provide this data to the new NAP via an accepted calibration protocol. This protocol may include the use of server 122 to perform this calibration or it may be performed using only direct interaction between the NAPs themselves. This protocol may establish within the internal memory of the newly added NAP its spatial location relative to either a relative coordinate system comprised of the network of existing NAPs, or an absolute coordinate system. Examples of absolute coordinates would include geographical coordinates, global positioning system (GPS) referenced coordinates, or building referenced coordinates. Examples of locating networks of NAPs in different coordinate systems are described below with reference to FIGS. 5 and 6.

Figure 3:
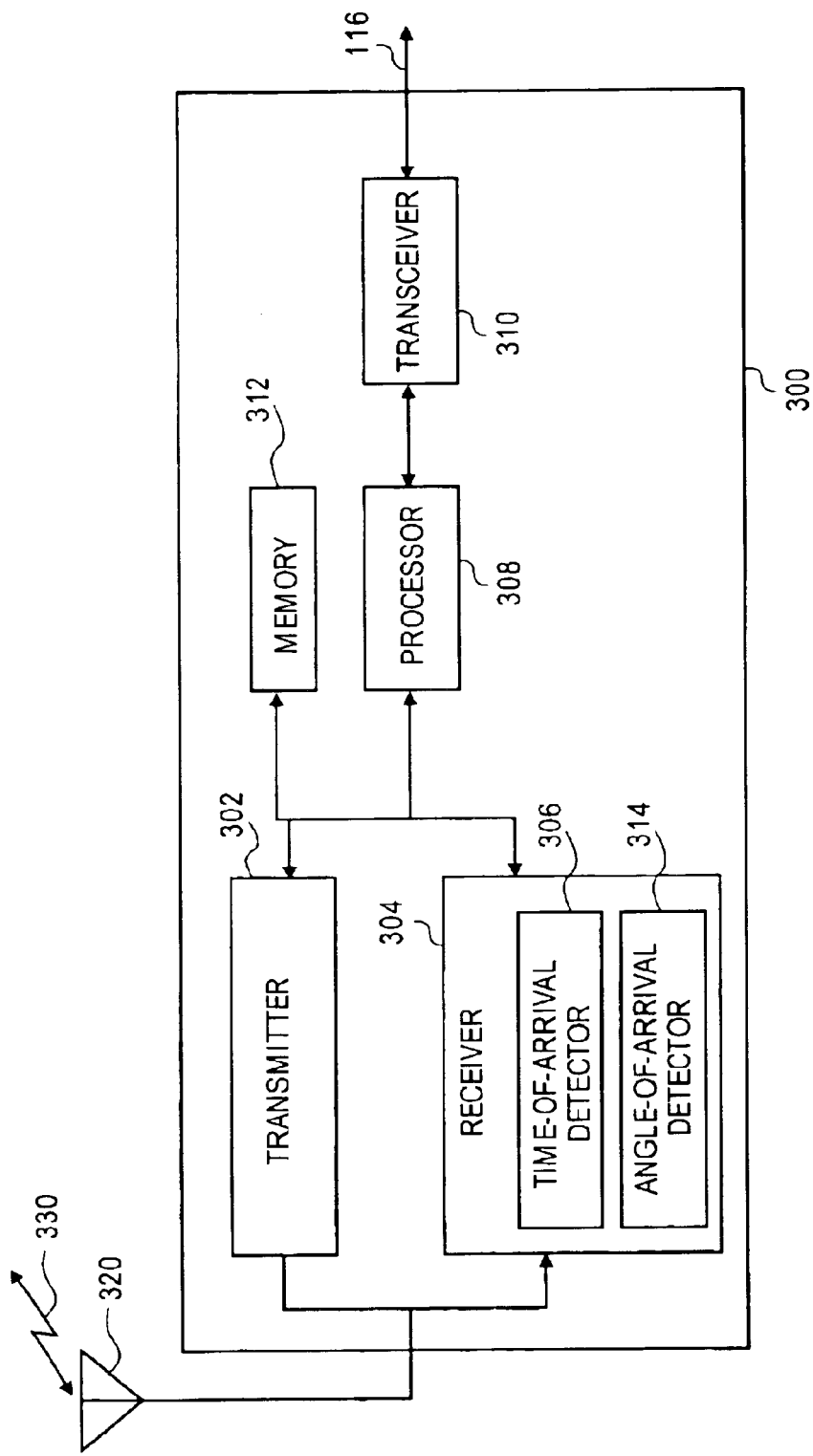
FIG. 3 shows a diagram of a network access point device.

FIG. 3 shows a diagram of a network access point device suitable for use at the network access points shown in FIGS. 1 and 2. Network access point device 300 includes transmitter 302, receiver 304, time-of-arrival detector 306, angle-of-arrival detector 314, processor 308, and transceiver 310. Transceiver 310 communicates with a server (not shown) using media 108. Transceiver 310 also communicates with processor 308. Transmitter 302 and receiver 304 both communicate with processor 308 and antenna 320.

Antenna 320 receives wireless signals from network nodes and asset tags on wireless link 330. In some embodiments, wireless signals on wireless link 330 include electromagnetic pulses as described above with reference to FIGS. 1 and 2. In these embodiments, receiver 304 receives the pulses, and time-of-arrival detector 306 detects the arrival time of the pulse. Time-of-arrival information is one of many possible attributes of a wireless signal that may be measured by receiver 304. For example, in some embodiments, angle-of-arrival detector 314 detects the angle from which the pulse arrived as an attribute of the wireless signal. Some embodiments measure both time-of-arrival and angle-of-arrival. Processor 308 receives information describing the wireless signal from receiver 304 and provides it to a network server using transceiver 310.

Time-of-arrival detector 306 may be implemented in a number of different ways. In one embodiment, the function of the time-of-arrival detector is a separate module within the network access point device 300. In other embodiments, time-of-arrival detector 306 is integrated into receiver 304. In yet other embodiments, time-of-arrival detector 306 utilizes processing capabilities of processor 308 to perform its function.

Angle-of-arrival detector 314 can also be implemented in a number of different ways. In some embodiments, angle-of-arrival detector 314 is a circuit that receives signals from a phased-array antenna to measure the angle from which the signals are received. In these embodiments, antenna 320 may represent a phased-array antenna. Many other mechanisms may be used to measure the angle-of-arrival of the wireless signal.

Processor 308 may be any type of processor suitable to perform actions to support the operation of network access point device 300. For example, processor 308 may be a microprocessor, a microcontroller, or the like. Also for example, processor 308 may be a hardware controller or a collection of hardware controllers that perform specific task. Memory 312 represents an article that includes a machine-accessible medium. For example, memory 312 may represent any one or more of the following: a hard disk, a floppy disk, random access memory (RAM), read only memory (ROM), flash memory, CDROM, or any other type of article that includes a medium readable by a machine. Memory 312 may store instructions for performing the execution of the various method embodiments of the present invention. Memory 312 may also include data describing the current state of network access point device 300 and the entire network.

When multiple network access point devices 300 measure attributes of a single electromagnetic pulse, a network server may utilize this information to resolve the location of the network node from which the pulse originated. Network access point device 300 may also utilize the information directly or in concert with one or more other network access points to resolve the location of the network access point device 300. In some embodiments, multiple electromagnetic pulses are received by receiver 304. The multiple electromagnetic pulses may represent any type of communication from a network node or from another network access point device. For example, a group of pulses may represent a request from a network node to locate a particular asset. Also for example, a group of pulses may represent a calibration sequence transmitted by a different network access device during a configuration sequence. Receiver 304 derives information from groups of pulses, as well as from attributes describing the pulses. Processor 308 receives from receiver 304 information describing both groups of pulses as well as attributes of individual pulses. For example, processor 308 may receive data from a network node, as well as receiving time-of-arrival and angle-of-arrival information of pulses received by receiver 304.

Figure 4:
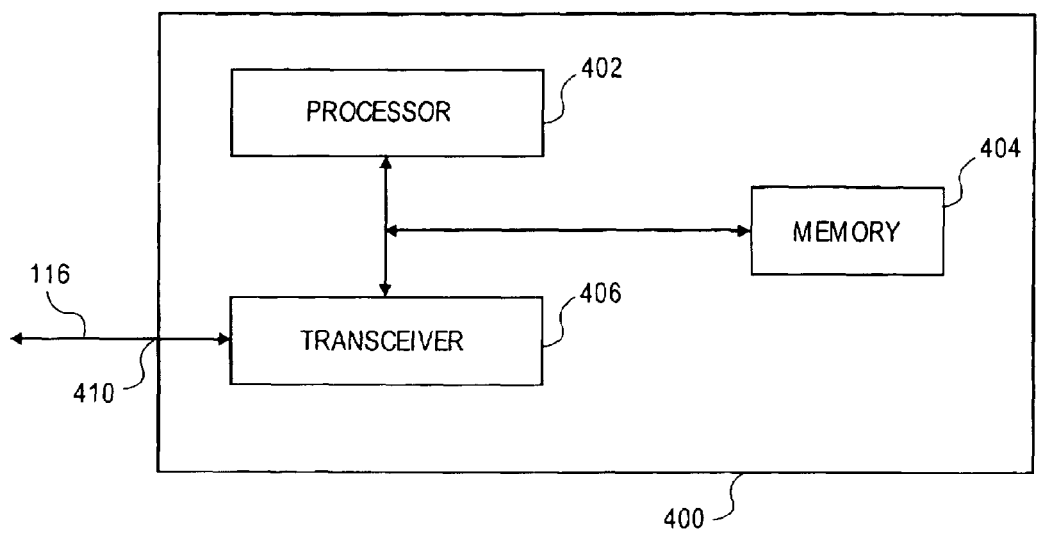
FIG. 4 shows a diagram of a network server.

FIG. 4 shows a diagram of a network server suitable for use in a wireless network such as network 100 (FIG. 1) or network 200 (FIG. 2). Server 400 includes processor 402, memory 404, and transceiver 406. Transceiver 406 is coupled to media 108 at port 116. As described above with reference to FIG. 1, media 108 couples the network server with any number of network access point devices such as network access point device 300 (FIG. 3). Transceiver 406 receives information from network access point devices on media 108. In some embodiments, wireless signal attributes are received from multiple network access point devices, and processor 402 determines the location of a transmitter from which the wireless signals originated. Server 400 may be a personal computer (PC), server, mainframe, handheld device, portable computer, or any other system that may perform the operations described herein.

Memory 404 represents an article that includes a machine-accessible medium. For example, memory 404 may represent any one or more of the following: a hard disk, a floppy disk, random access memory (RAM), read only memory (ROM), flash memory, CDROM, or any other type of article that includes a medium readable by a machine.

Memory 404 may store instructions for performing the execution of the various method embodiments of the present invention. Memory 404 may also include data describing the current state of server 400 and the entire network. For example, memory 404 may include data describing assets, asset serial numbers, locations of assets, as well as the locations of network nodes.

Figure 5:
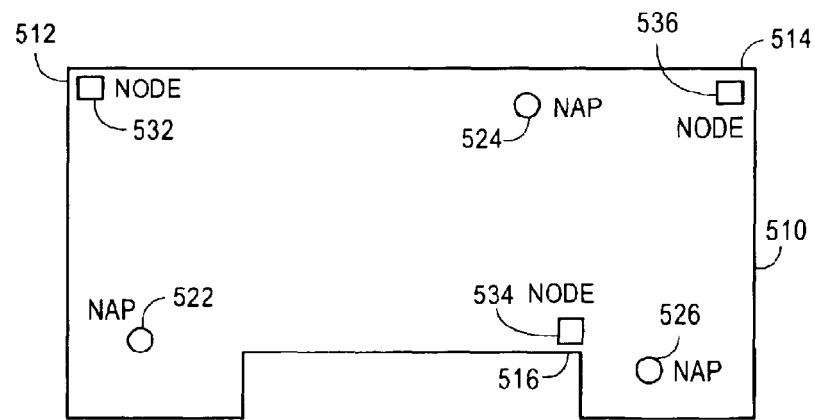
FIG. 5 shows a first diagram of network access point devices placed within a boundary.

FIG. 5 shows a first diagram of network access point devices placed within a boundary. Shown within boundary 510 are NAPs 522, 524, and 526. Also shown within boundary 510 are network nodes 532, 534, and 536. FIG. 5 illustrates various methods to locate the various NAPs relative to a coordinate system. As shown in FIG. 5, the coordinate system is represented by boundary 510. Boundary 510 may represent any type of boundary or coordinate system. For example, boundary 510 may represent a building, a geographic boundary, or any other type of boundary. Boundary 510 may also represent any type of coordinate system. For example, boundary 510 may represent geographical coordinates, global positioning system (GPS) referenced coordinates, or building referenced coordinates.

FIG. 5 illustrates various methods to locate NAPs relative to a coordinate system. Methods illustrated by FIG. 5 are referred to herein as "key floorplan points methods." For the purpose of explaining the key floorplan points methods, it is assumed that in FIG. 5 the relative locations of the NAPs is known, but that the locations of the NAPs relative to boundary 510 is not known. This situation may arise when a first NAP is placed at an arbitrary location, and then multiple other NAPs are added to a network and "located" relative to the first NAP.

In the key floorplan points methods, network nodes are placed at known "key" points within the floorplan (or coordinate system) and then the location of the network nodes relative to the NAPs is determined. For example, as shown in FIG. 5, network node 532 is placed at key point 512, network node 534 is placed at key point 516, and network node 536 is placed at key point 514. In some embodiments, a single network node is moved from key point to key point rather than a separate node being placed at each. For example, a single network node may be placed at key point 512 and located, then moved to key point 514 and located, and then moved to key point 516 and located.

The key points may be manually or automatically identified to the network. For example, a server (not shown) coupled to the NAPs may have the actual locations of the key points manually entered. When the network nodes are placed at the key points and their locations relative to the NAPs are determined, the server may calculate any scaling to appropriately place the NAPs in the coordinate system represented by boundary 510.

Figure 6:
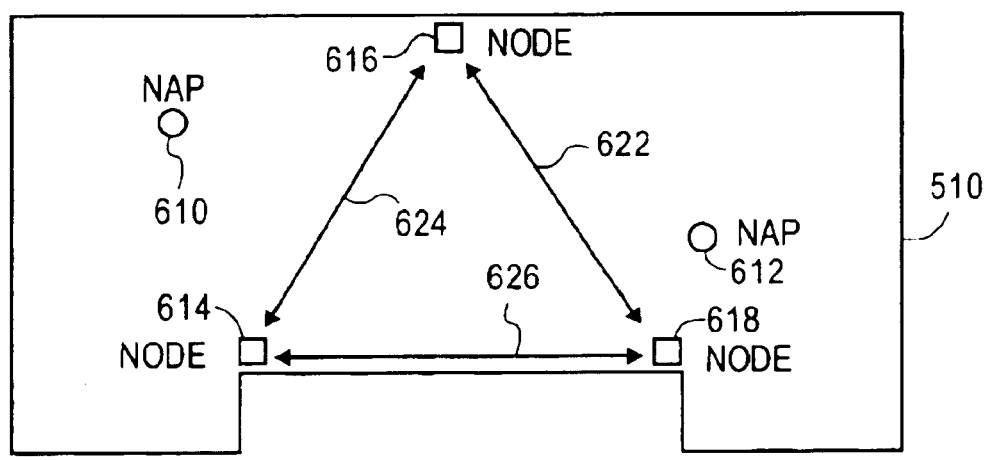
FIG. 6 shows a second diagram of network access point devices placed within a boundary.

FIG. 6 shows a second diagram of network access point devices placed within a boundary. Shown within boundary 510 are NAPs 610 and 612. Also shown within boundary 510 are network nodes 614, 616, and 618. FIG. 6 illustrates various methods to locate the various NAPs relative to a coordinate system. As shown in FIG. 6, the coordinate system is represented by boundary 510. Boundary 510 may represent any type of boundary or coordinate system. For example, boundary 510 may represent a building, a geographic boundary, or any other type of boundary. Boundary 510 may also represent any type of coordinate system. For example, boundary 510 may represent geographical coordinates, global positioning system (GPS) referenced coordinates, or building referenced coordinates.

FIG. 6 illustrates various methods to locate NAPs relative to a coordinate system. Methods illustrated by FIG. 6 are referred to herein as "known distance methods." For the purpose of explaining the known distance methods, it is assumed that in FIG. 6 the relative locations of the NAPs is known, but that the locations of the NAPs relative to boundary 510 is not known. This situation may arise when a first NAP is placed at an arbitrary location, and then multiple other NAPs are added to a network and "located" relative to the first NAP.

In the known distance methods, network nodes are placed within boundary 510 at known distances from each other and then the location of the network nodes relative to the NAPs is determined. For example, as shown in FIG. 6, network nodes 614 and 616 are placed at distance 624 from each other, network nodes 614 and 618 are placed at distance 626 from each other, and network nodes 616 and 618 are placed at distance 622 from each other. The points at which the network nodes are placed are referred to herein as the "mobile locations." In some embodiments, a single network node is moved from one mobile location to another rather than a separate node being placed at each. For example, a single network node may be moved between the mobile locations of nodes 614, 616, and 618 as shown in FIG. 6.

The mobile locations may be manually or automatically identified to the network. For example, a server (not shown) coupled to the NAPs may have the actual locations of the mobile locations manually entered. When the network nodes are placed at the mobile locations and their locations relative to the NAPs are determined, the server may calculate any scaling to appropriately place the NAPs in the coordinate system represented by boundary 510.

Figure 7:
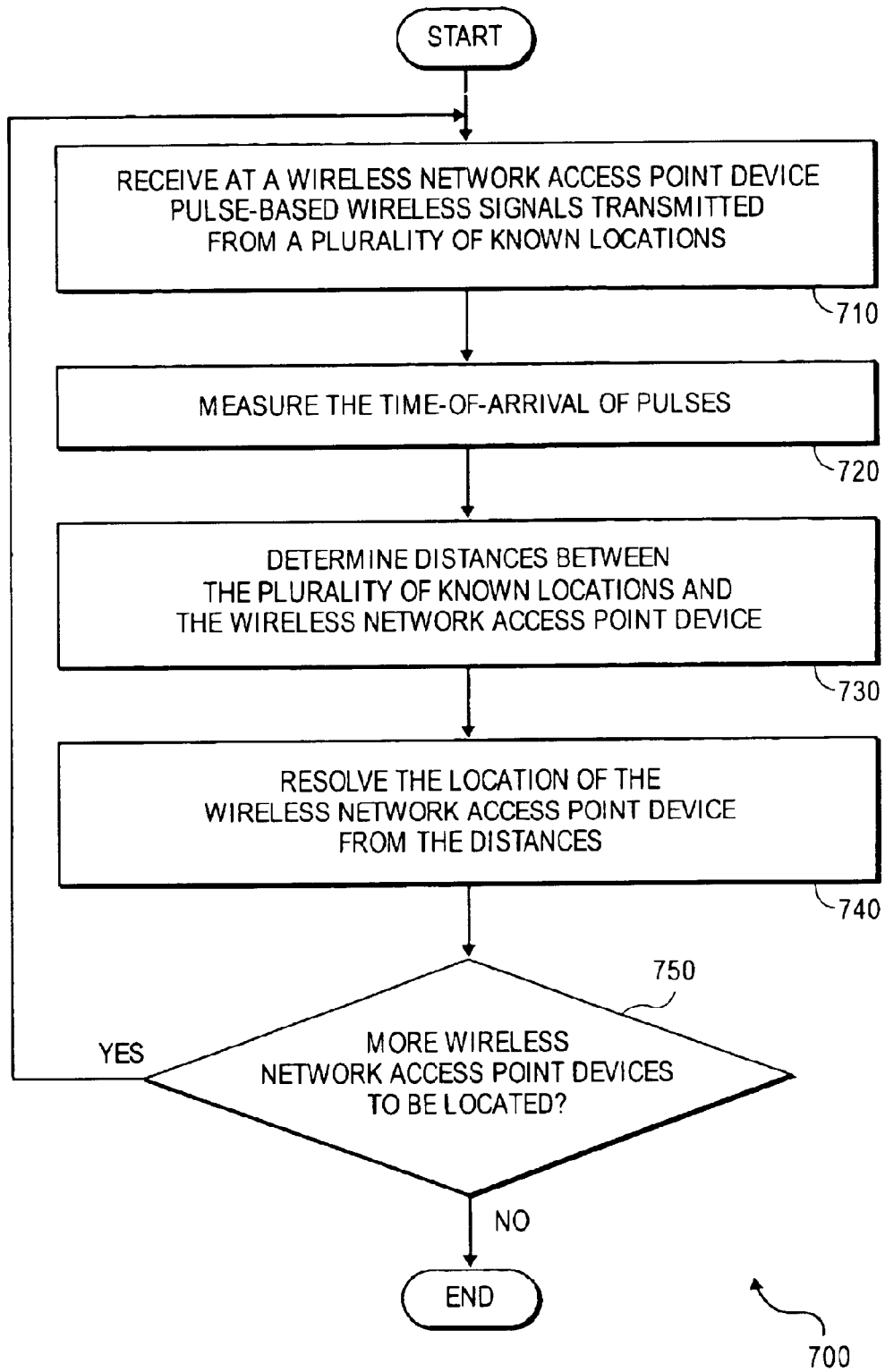
FIGS. 7, 8, and 9 show flowcharts in accordance with various embodiments of the present invention.
Figure 8:
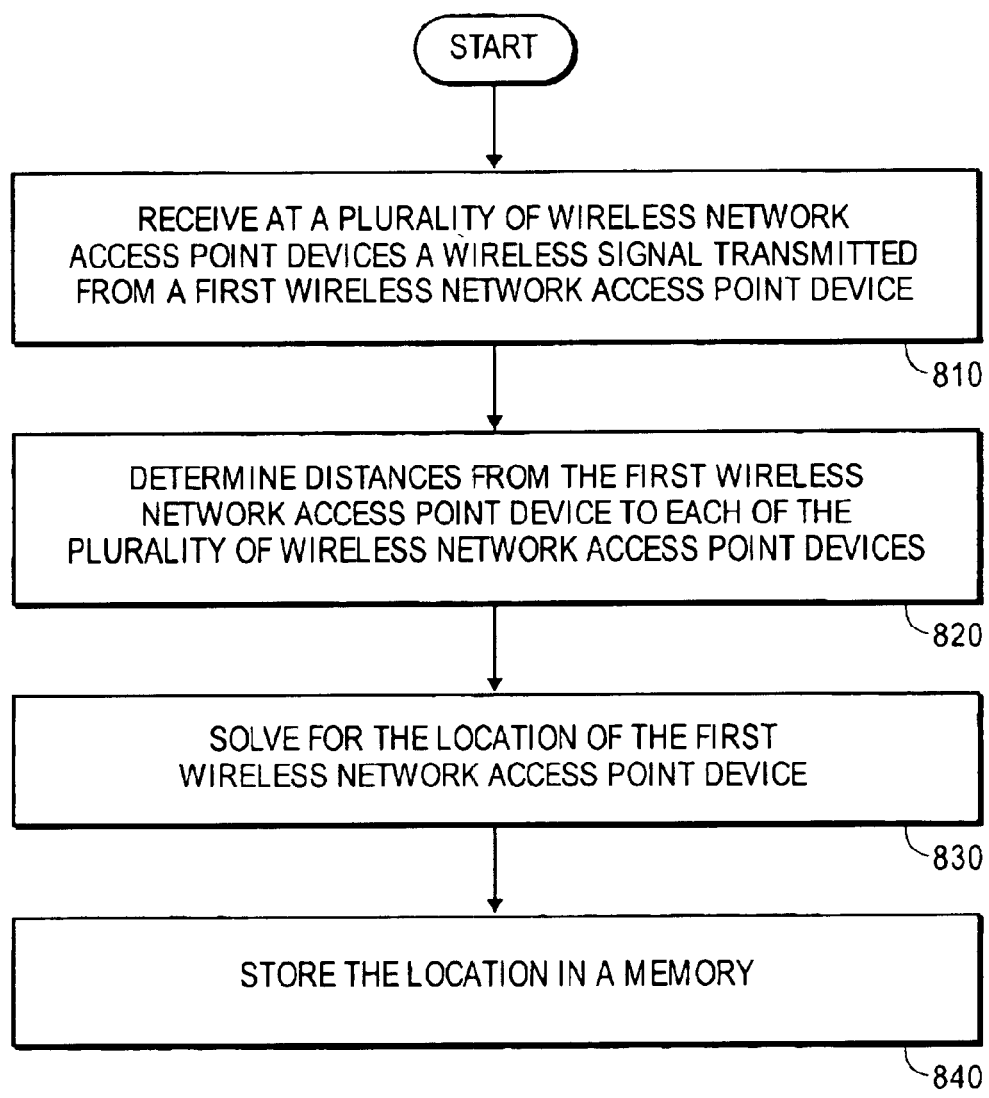
Figure 9:
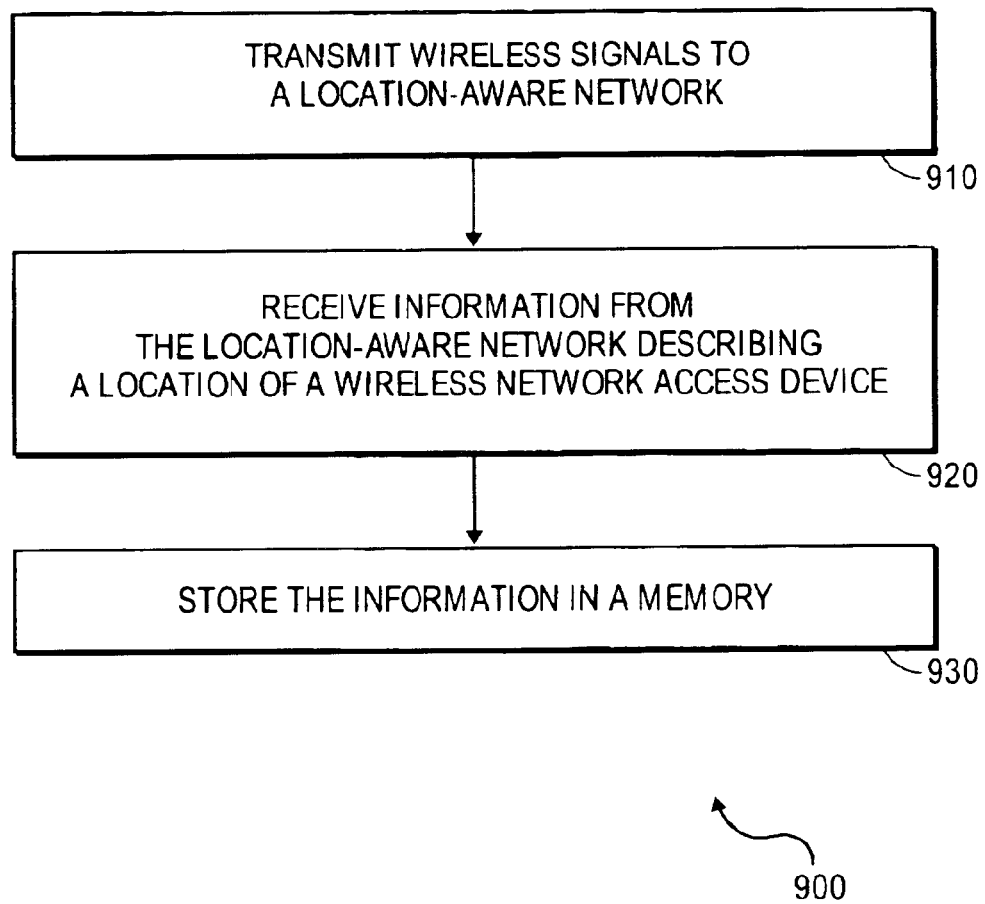

FIGS. 7, 8, and 9 show flowcharts in accordance with various embodiments of the present invention. The flowcharts shown in FIGS. 7, 8, and 9 illustrate various method embodiments that may be performed in networks. In some embodiments, the methods may be performed by a server such as server 122 (FIGS. 1 and 2) or by a network access node such as the network access points shown in FIGS. 1, 2, 4, 5, and 6. In other embodiments, the methods may be distributed across one or more servers and one or more network access point devices. The various actions shown in the figures may be performed in the order presented, or may be performed in a different order. Further, in some embodiments, some actions listed in the figures are omitted.

Referring now to FIG. 7, method 700 begins at 710 when a wireless network access point device receives pulse-based wireless signals from a plurality of known locations. In some embodiments, this may correspond to a newly added NAP receiving signals from a plurality of NAPs already in a network. For example, the actions at 710 may occur when newly added NAP 202 (FIG. 2) receives pulse-based wireless signals on wireless links 212, 214, and 216.

At 720, the time-of-arrival of the pulses is measured. This may correspond to NAP 202 measuring the times-of-arrival using a time-of-arrival detector such as time-of-arrival detector 306 (FIG. 3). At 730, distances between the plurality of known locations and the wireless network access point device are determined. These distances may be determined by comparing the time at which the pulses were transmitted and the time at which they were received. At 740, the location of the wireless network access point is resolved from distances. In some embodiments, a triangulation calculation is performed to resolve the location.

After 740, the location of the wireless network access point is known. When the wireless network access point is a newly added NAP, this NAP may then be used to help locate other newly added NAPs. At 750, a determination is made as to whether there are more wireless access devices to be located. If so, method 700 repeats for each wireless access point device to be located. If not method 700 ends.

In some embodiments, statistical methods are used to further refine the location of the wireless network access point device referred to in method 700. For example, the actions listed at 710, 720, 730, and 740 may be repeated multiple times for each wireless network access point device to create a "point cloud" of locations that can be manipulated statistically to increase the accuracy with which the wireless network access point device is located.

Referring now to FIG. 8, method 800 begins when a wireless signal transmitted from a first wireless network access point device is received at a plurality of different wireless network access point devices. In some embodiments, this may correspond to a newly added NAP transmitting signals to a plurality of NAPs already in a network. For example, the actions at 810 may occur when newly added NAP 202 (FIG. 2) transmits wireless signals to NAPs 102, 104, and 106 on wireless links 212, 214, and 216.

At 820, distances between the first wireless network access point device and the plurality of different wireless network access points are determined. These distances may be determined by comparing the time at which the pulses were transmitted and the time at which they were received. At 830, the location of the first wireless network access point is resolved from distances. In some embodiments, a triangulation calculation is performed to resolve the location.

After 830, the location of the first wireless network access point is known. When the first wireless network access point is a newly added NAP, this NAP may then be used to help locate other newly added NAPs. The actions in method 800 may be repeated to locate multiple wireless network access point devices. In addition, in some embodiments, statistical methods are used to further refine the location of the first wireless network access point device referred to in method 800. For example, the actions listed at 810, 820, 830, and 840 may be repeated multiple times for each wireless network access point device to create a "point cloud" of locations that can be manipulated statistically to increase the accuracy with which the wireless network access point device is located.

Referring now to FIG. 9, method 900 begins at 910 when wireless signals are transmitted to a location-aware network. This may correspond to any of the NAPs previously described transmitting a signal to a location-aware network. For example, the actions in 910 may correspond to NAP 202 transmitting signals to NAPs 102, 104, and 106.

At 920, information describing the location of a wireless network access device is received from the location-aware network. In some embodiments, this corresponds to a wireless network access point device receiving from the network information describing its location. This information may be received on a wireless link, or on a media other than a wireless link. For example, referring now back to FIG. 2, when the wireless network access point device is newly added NAP 202, the information may be received on any wireless links 212, 214, or 216, or on media 116. At 930, the information describing the location of the wireless network access point device is stored in a memory. The memory may be resident in the wireless access point device itself, or elsewhere in the network. For example, newly added wireless network access point device 202 may include a memory device in which the information is stored, or a server such as server 122 may include a memory in which the information is stored.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving at a wireless network access point device wireless signals transmitted from a plurality of known locations;
   determining distances between the plurality of known locations and the wireless network access point device from the transmitted wireless signals; and
   resolving, within the wireless network access point device, a location of the wireless network access point device from the distances;
   wherein a transmitter is moved to the plurality of known locations to transmit the wireless signals.

2. The method of claim 1 wherein said receiving wireless signals comprises receiving electromagnetic pulses.

3. The method of claim 2 wherein said determining distances comprises measuring a time-of-arrival of pulses received at the wireless network access point device.

4. The method of claim 2 wherein said determining distances comprises measuring an angle-of-arrival of pulses received at the wireless network access point device.

5. The method of claim 1 further comprising repeating said receiving, said determining, and said resolving for each of a plurality of wireless network access point devices.

6. The method of claim 1 further comprising repeating said receiving, determining, and resolving multiple times to obtain multiple values for the location; and
   treating the multiple values statistically to obtain a final value for the location.

7. The method of claim 1 wherein the plurality of known locations correspond to known locations in a building.

8. The method of claim 1 wherein the plurality of known locations correspond to known geographical locations.

9. An article comprising
   a machine-readable medium that provides instructions, which when executed by a processing platform, cause said processing platform to perform operations comprising:
      receiving, at a wireless network device, wireless signals transmitted from a plurality of known locations from a transmitter moved to the plurality of known locations;
      determining distances between the plurality of known locations and the wireless network device from characteristics of the received wireless signals; and
      resolving, within the wireless network device, a location of the wireless network device from the distances.

10. The article of claim 9 wherein the characteristics of the received wireless signals comprise time-of-arrival information.

11. The article of claim 9 wherein the characteristics of the received wireless signals comprise angle-of-arrival information.

12. A method, comprising:
    communicating wireless signals between a network node and a plurality of wireless network devices, wherein locations of the plurality of wireless network devices relative to each other is known and the network node is located at a key point within a particular boundary;

determining distances from the network node to each of the plurality of wireless network devices;

solving, within the network node, for a location of the network node relative to the plurality of wireless network devices;

repeating said communicating, determining, and solving for other key points within the particular boundary; and determining locations of the plurality of wireless network devices relative to the particular boundary;

wherein a same network node is used at each of the key points.

13. The method of claim 12, wherein the particular boundary defines a floor plan.

14. The method of claim 13, wherein the key points correspond approximately to corners of the floor plan.

15. An article comprising a machine-readable medium that provides instructions, which when executed by a processing platform, cause said processing platform to perform operations comprising:

communicating wireless signals between a network node and a plurality of wireless network devices, wherein locations of the plurality of wireless network devices relative to each other is known and the network node is at a key point within a particular boundary;

determining distances from the network node to each of the plurality of wireless network devices;

solving, within the network node, for a location of the network node relative to the plurality of wireless network devices;

repeating said communicating, determining, and solving for other key points within the particular boundary; and determining locations of the plurality of wireless network devices relative to the particular boundary;

wherein a same network node is used at each of the key points.

16. The article of claim 15, wherein the particular boundary defines a floor plan.

17. The article of claim 16, wherein the key points correspond approximately to corners of the floor plan.

* * * * *